United States Patent Office 3,662,054
Patented May 9, 1972

3,662,054
METHOD OF MANUFACTURE OF
RUBBER ARTICLES
Ernest Wollmann, Pottschach, and Josef Zartl, Vienna, Austria, assignors to Semperit Osterreichisch-Amerikanische Gummiwerke Aktiengesellschaft, Viennna, Austria
No Drawing. Filed Mar. 19, 1970, Ser. No. 21,208
Claims priority, application Austria, Mar. 21, 1969, A 2,846/69
Int. Cl. B29c 25/00
U.S. Cl. 264—131  3 Claims

ABSTRACT OF THE DISCLOSURE

A method of producing a rubber article manufactured according to the latex dipping method, in which the surface to come into contact with the human body is treated and prepared respectively with a buffer substance tolerated by the skin, selected from the group consisting of esters of oxy-benzoic acid, in order to neutralize traces of alkalis.

---

It is known that the latex blends used for the manufacture of gloves by dipping give an alkaline reaction. Gloves made by immersion of glass or porcelain moulds into latex blends therefore give off minor amounts of alkalis after finishing, which may cause allergic reactions of the skin, when the gloves are used in the household or in surgery.

Alkalis, however, are primarily skin-irritant substances, as they destroy the acid film of the skin. This protective function of the skin—which is important for prophylactic care—is based on small amounts of acids secreted by the perspiration glands that normally will keep the pH of the skin well within the acid range. A destruction of the acid film of the skin by soap, borax or soda may be overcome by cosmetic containing e.g. citric acid, tartaric acid or boric acid.

It has now been found that the interference with the acid film of the skin by the use of gloves made according to the latex immersion method is prevented by applying esters of oxy-benzoic acid—preferably of salicylic acid—to the inner surface of the gloves. Such esters are e.g. the acetic acid ester of salicylic acid —CH$_3$COOC$_6$H$_4$CO$_2$H— and the salicylo-salicylic acid

—HO—C$_6$H$_4$—COOC$_6$H$_4$CO$_2$H— which esters can give off salicylic acid by dissociation.

It is, accordingly, the primary object of the present invention to provide articles of the type described with a buffer substance thereon to counteract the alkali traces therein, and the method of producing the same.

Such buffer substances tolerated by the skin allow a better preservation of the acid film than by the organic acids themselves which could be proved by animal-experiments (on the shaved skin of rabbits and guinea-pigs). Of course, the application of the instant invention is not restricted to gloves but may be used for any rubber articles made according to the latex immersion method which come into contact with the skin, such as preservatives, face masks, bathing caps and the like. The buffer substances covered by the invention are applied to the rubber articles either mixed with dusting powders such as, for example, wheat starch, zinc oxide, talc or lycopodium or by treating the rubber articles with solutions of salicylic acid ester before or after drying.

As a powder for dusting surgical gloves or other articles a mixture of 90 parts of starch or talcum and
10 parts of acetyl-salicylic acid may be used.

For the treatment of a not powdered article a solution of 95 parts of isopropyl alcohol (IPA) and
5 parts of salicylo-salicylic acid is proposed according to the invention.

On the other other hand the following solution may be provided for treating household gloves of latex with a textile reinforcement or fibrous velour finish on their inner surface:

1 part of salicyl anilide in 95 parts of water with a small amount of isopropyl alcohol (IPA) added.

In due course of manufacture or thereafter the inner surface of the glove is brought into contact with the solution. After drying the inner surface of the glove will be anti-allergic and also will be equipped with an anti-body against mycosis.

What we claim is:

1. In a method of manufacture of a rubber article wherein said article is formed by dipipng a form into a latex blend said article having a surface which comes into contact with the human body and which has minor amounts of alkalis the improvement comprising treating said surface with a buffer substance tolerated by the skin for neutralizing said alkalis, said buffer substance being selected from the group consisting of esters of oxy-benzoic acid.

2. A method according to claim 1, wherein said buffer substance is applied to said surface mixed with a dusting powder.

3. A method according to claim 1, wherein said buffer substance is applied to said rubber article in a solution, before drying said article.

References Cited

UNITED STATES PATENTS 2,318,657  5/1943  Alexander _____ 264—340
2,507,244  5/1950  Correll _____ 2—168

ROBERT F. WHITE, Primary Examiner

G. AUVILLE, Assistant Examiner

U.S. Cl. X.R.

2—168; 117—18, 139; 264—232, 301